(12) United States Patent
Lagnado

(10) Patent No.: US 10,873,212 B2
(45) Date of Patent: Dec. 22, 2020

(54) WIRELESS CHARGING AT A LOWER CLASS TYPE

(71) Applicant: HEWLETT-PACKARD DEVELOPMENT COMPANY, L.P., Houston, TX (US)

(72) Inventor: Isaac Lagnado, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 140 days.

(21) Appl. No.: 15/563,971

(22) PCT Filed: May 29, 2015

(86) PCT No.: PCT/US2015/033295
§ 371 (c)(1),
(2) Date: Oct. 3, 2017

(87) PCT Pub. No.: WO2016/195636
PCT Pub. Date: Dec. 8, 2016

(65) Prior Publication Data
US 2018/0138744 A1 May 17, 2018

(51) Int. Cl.
*H02J 7/00* (2006.01)
*H02J 7/14* (2006.01)
(Continued)

(52) U.S. Cl.
CPC .............. *H02J 50/10* (2016.02); *H02J 7/025* (2013.01); *H02J 50/40* (2016.02); *H02J 50/80* (2016.02)

(58) Field of Classification Search
USPC ................................. 320/107, 108, 109, 134
See application file for complete search history.

(56) References Cited

U.S. PATENT DOCUMENTS 8,373,386 B2  2/2013  Baarman et al.
8,497,658 B2  7/2013  Von Novak et al.
(Continued)

FOREIGN PATENT DOCUMENTS

EP  2871090       5/2015
JP  2014011906 A  1/2014
(Continued)

OTHER PUBLICATIONS

Joehren, M. et al.; "Development of an Optimized Wireless Charging Application Solution"; Jan. 2014; 8 pages.

*Primary Examiner* — Alexis B Pacheco
(74) *Attorney, Agent, or Firm* — Tong, Rea, Bentley & Kim LLC

(57) ABSTRACT

In example implementations, a wireless charging request at a first class type is sent by a power receiving unit (PRU) to a power transmitting unite (PTU) for an amount of power from the PTU. A charging fail notification is received from the PTU due to a mismatch in an amount of power available from the PTU and the amount of power requested in the wireless charging request. A wireless charging request is sent to the PTU at a lower class type than the first class type that matches the amount of power available from the PTU. The PRU is charged with the amount of power available from the PTU. The wireless charging request is re-sent at the first class type to the PTU after a pre-defined period of time to charge at the amount of power requested by the wireless charging request at the first class type.

6 Claims, 5 Drawing Sheets

(51) Int. Cl.
*H02J 50/10* (2016.01)
*H02J 7/02* (2016.01)
*H02J 50/40* (2016.01)
*H02J 50/80* (2016.01)

(56) References Cited

U.S. PATENT DOCUMENTS

| | | | |
|---|---|---|---|
| 2012/0091800 A1* | 4/2012 | Shenoy | H01L 31/02021 307/24 |
| 2012/0313447 A1 | 12/2012 | Park et al. | |
| 2013/0214735 A1 | 8/2013 | Kang et al. | |
| 2013/0217409 A1* | 8/2013 | Bridges | B60L 53/305 455/456.1 |
| 2014/0015478 A1 | 1/2014 | Von Novak | |
| 2014/0070625 A1* | 3/2014 | Kim | H01F 38/14 307/104 |
| 2014/0152117 A1 | 6/2014 | Sankar | |
| 2014/0159508 A1 | 6/2014 | Sankar et al. | |
| 2015/0031334 A1 | 1/2015 | Wu | |
| 2015/0097433 A1* | 4/2015 | Shichino | H02J 7/0063 307/32 |
| 2015/0249339 A1* | 9/2015 | Van Wageningen | H02J 5/005 307/104 |
| 2017/0237469 A1* | 8/2017 | Taghivand | H02J 50/20 455/41.1 |

FOREIGN PATENT DOCUMENTS

| | | |
|---|---|---|
| WO | WO-2013100764 | 7/2013 |
| WO | WO-2014001983 A1 | 1/2014 |
| WO | WO-2014208375 A2 | 12/2014 |

\* cited by examiner

WIRELESS CHARGING AT A LOWER CLASS TYPE

BACKGROUND

Wireless charging capabilities are becoming a more popular way of recharging batteries of mobile devices. Wireless charging uses magnetic resonance or magnetic inductance to transfer electrical power to a battery. Wireless charging can be used to recharge cellphones, tablet computers, lap top computers, and the like. Various standards are being created to standardize wireless charging devices and provide a consistent user experience between the different wireless charging devices.

DETAILED DESCRIPTION

The present disclosure discloses a method and non-transitory computer-readable medium for providing sub-optimal wireless charging. As discussed above, standards are being created to standardize wireless charging devices. However, these standards have limitations when an amount of power requested by a power receiving unit (PRU) is higher than what is available from a power transmitting unit (PTU). Under the current standards, when a power mismatch is detected, the PTU may not recharge the PRU. In other words, the wireless power charging may fail to provide any power to the requesting device.

Examples of the present disclosure provide a method for providing sub-optimal wireless charging even when a power mismatch is detected between the PRU and PTU. The PRU may temporarily "disguise" itself as a device that requires a lower power output that matches what is available from the PTU for wireless recharging. Subsequently, at a later time when more power is available from the PTU, the PRU may re-initiate the power charging to obtain more power output, or full power output, that the PRU requires from the PTU.

Figure 1:
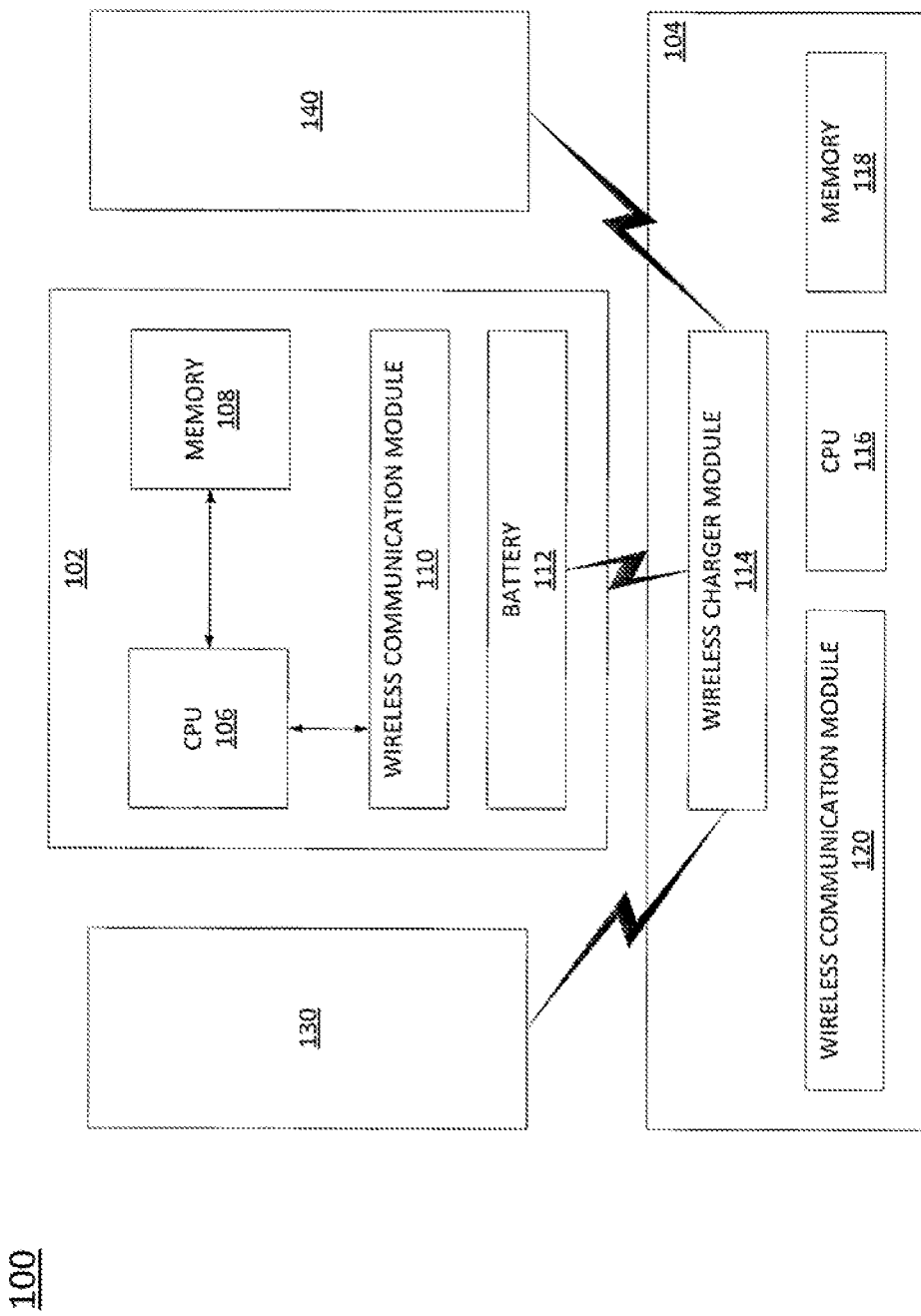
FIG. 1 is a block diagram of an example system of the present disclosure.

FIG. 1 illustrates an example system 100 of the present disclosure. In one example, the system 100 includes a power receiving unit (PRU) 102 and additional PRUs 130 and 140. The PRU 102 may include a processor or CPU 106, a memory 108, a wireless communication module 110 and a battery 112. In one example, the wireless communication module 110 may be implemented via a local area network (LAN) (e.g., a wireless fidelity (Wi-Fi) connection) or a personal area network (PAN) (e.g., a Bluetooth connection). In one example, the PRUs 130 and 140 may be similar to the PRU 102. Although three PRUs 102, 120 and 130 are illustrated in FIG. 1, it should be noted that any number of PRUs may be deployed.

In one example, the PRUs 102, 130 and 140 may be any type of mobile endpoint device that uses a battery for power. For example, the PRUs 102, 130 and 140 may be a mobile telephone, a smart phone, a tablet computer, a laptop computer, a handheld device, a portable video game device, and the like.

In one example, the system 100 includes a power transmitting unit (PTU) 104. The PTU 104 may include a wireless charging module 114, a processor or CPU 116, a memory 118 and a wireless communication module 120. In one example, the wireless communication module 120 may be implemented via a local area network (LAN) (e.g., a Wi-Fi connection) or a personal area network (PAN) (e.g., a Bluetooth connection). In one example, the PTU 104 may be deployed as a flat mat or an apparatus having a level surface. The PRUs 102, 130 and 140 can be placed on top of the flat mat or level surface to have the battery 112 be wirelessly charged by the PTU 104.

Previously, the PRUs 102, 130 and 140 were recharged via a wired power source or adapter that would be plugged into an electrical outlet. As technology improves, wireless charging is becoming more available based on the principles of magnetic resonance and/or inductance. As wireless charging becomes more available, standards are being written for wireless charging. However, standards such as Alliance for Wireless Power (A4WP) currently have limitations.

For example, current standards may assign a class type or a category type to various different PRUs 102, 130 and 140 and the PTU 104. Each class type may be associated with a different amount of power to recharge the respective battery 112. For example, class 1 may require 25 Watts (W) of power, class 2 may require 20 W of power, class 3 may require 15 W of power, class 4 may require 10 W of power, class 5 may require 5 W of power, and so forth.

Alternatively, in another example, the higher the class the higher the power capability. For example, in A4WP a category type may be assigned to each PRU 102, 130 and 140 and a class type may be assigned to the PTU 104. The higher the number of the category type or the class type, the higher the power capability. Thus, the present disclosure may be applied to any type of wireless recharging that uses a classification of the PRUs 102, 130 and 140 and the PTU 104 and provides power based on the class or category type of the PRUs 102, 130 and 140 and the PTU 104.

In addition, each PTU 104 may be associated with a class type and/or the amount of power that may be available for recharging as PRUs 102, 130 and 140 are added and removed from the PTU 104. As a result, if the amount of power requested by the PRU 102 based on the assigned class type does not match the amount of power available from the PTU 104, the wireless charging may fail and not initiate.

One example of the present disclosure allows the PRU 102 to disguise itself as a different class type that requires a lower amount of power if the amount of power in an initial wireless charging request is not available from the PTU 104. For example, if the PRU 102 is a class 1 device that requires 25 W of power and the PTU has 20 W available, then the PRU 102 may re-send a wireless charging request for wireless charging as a class 2 device that requires 20 W of power. The PRU 102 may then recharge the battery 112 using a lower amount of power. In other words, rather than having the wireless charging request completely fail and receive no power at all, the present disclosure allows the PRU 102 to accept wireless recharging at a lower power.

In addition, one example of the present disclosure allows the PRU 102 to receive wireless recharging at full power at a later time when the full amount of power is available from the PTU 104. Alternatively, the PRU 102 may receive wireless recharging with more power and gradually increase the amount of power received each time more power becomes available from the PTU 104. For example, rather than requiring the PRU 102 to fully recharge at the lower power amount, the present disclosure may periodically check to see if more power is available from the PTU 104 and receive full power, or more power, as more power becomes available from the PTU 104.

In one example, a pre-defined period of time may be used to automatically re-send the wireless charging request at the initial class type of the PRU 102 for full power recharging. For example, every 60 seconds, the PRU 102 may send a wireless charging request at the initial class type of the PRU 102 for full power recharging. The process may be repeated until the battery 112 of the PRU 102 is fully recharged or the wireless charging request sent by the PRU 102 at the initial class type for full power recharging is accepted.

In another example, the PTU 104 may send a notification to the PRU 102 that more power is available such that the PRU 102 may re-send the wireless charging request at the initial class type in response to the notification. In one example, the notification may be based on a priority level of the PRUs 102, 130 and 140 on the PTU 104 or a recharging threshold being reached for the PRUs 102, 130 and 140.

For example, a priority level may be assigned to the PRUs 102, 130 and 140 by the user and the amount of power allocated to the PRUs 102, 130 and 140 from the PTU 104 may be based upon the priority level. Each PRU 102, 130 and 140 may have an identification, e.g., a unique identifier (e.g., a device ID, a media access control (MAC) ID number, a user created name, and the like) and be assigned a priority level that is stored in the memory 108. For example, a user may assign the PRU 130 with priority level 1 or a highest priority, the PRU 140 with a priority level 3 or a lowest priority and PRU 102 with a priority level 2 or a middle priority.

For example, the PTU 104 may already be charging the PRU 130 and PRU 140. When the PRU 102 is placed on the PTU 104, the unique identifier and the priority level may be transmitted to the PTU 104 using a wireless communication protocol via the wireless communication module 110 and 114. In other words, the wireless communication protocol is established or designed to communicate any type of information between the PRU 102 and the PTU 104 in which the unique identifier, the class type and the priority level are examples as to the type of information that can be communicated between the PRU 102 and the PTU 104. The PTU 104 may compare the priority level of the PRU 102 to the priority levels of the PRU 130 and 140 stored in the memory 118 and determine that the PRU 130 has a higher priority. As a result, the PRU 102 may re-send the wireless charging request at a lower class type than initially requested to recharge at a lower power level.

At a later time, the PRU 130 finishes recharging and is removed from the PTU 104. The PTU 104 may compare the priority level of the remaining PRU 102 and PRU 140 and determine that the PRU 102 now has the highest priority level. The PTU 104 may send a notification to the PRU 102 that more power is available. In one example, the notification may specify the amount of power available such that the PRU 102 may know what class type to include in the wireless charging request that is re-sent in response to the notification.

For example, if the notification indicates that 25 W of power is now available, the PRU 102 may re-send the wireless charging request as a class 1 device for full power recharging. In another example, the notification may indicate that 15 W are now available. The PRU 102 may have been recharging as a class 5 device with 5 W of power. Thus, the PRU 102 may re-send the wireless charging request as a class 3 device to increase the wireless charging to 15 W of power rather than 5 W of power.

Alternatively, the notification may simply indicate that more power is available without a specific amount. The PRU 102 may then re-send the wireless charging request as a class 1 device and continue to re-send the wireless charging request at a next lower class type (e.g., class 2 device in the next wireless charging request, class 3 device in the next wireless charging request, and so forth) until the amount of power associated with the class type matches the amount of power available at the PTU 104.

In another example, the PTU 104 may send a notification to the PRU 102 when a recharging threshold is reached for the PRUs 130 and 140. For example, the PTU 104 may redistribute power to the PRU 102 when the PRUs 130 and 140 have reached a recharging threshold of 50% or greater. In other words, when the batteries 112 of the PRUs 130 and 140 are recharged to 50% or greater, the PTU 104 may reallocate the power from the PRUs 130 and 140 to the PRU 102.

In one example, the PTU 104 may send a notification to the PRU 102 based upon a combination of the priority level and the recharging threshold. For example, the PRU 140 with the highest priority level may continue to receive full power recharging until it reaches the 50% recharging threshold.

As a result, by allowing the PRUs 102, 130 and 140 to renegotiate the amount of power that is received for recharging the respective batteries 112, the PRUs 102, 130 and 140 may be more efficiently recharged. In other words, the PRUs 102, 130 and 140 are not stuck with the lower amount of power initially accepted for wireless recharging for the entire duration of the recharging cycle.

It should be noted that the above examples used a classification method that assigns a higher power capability for a lower class. However, it should be noted that the examples may be applicable to a classification method that assigns a higher power capability for a higher class or a higher category (e.g., A4WP, as described above).

Figure 2:
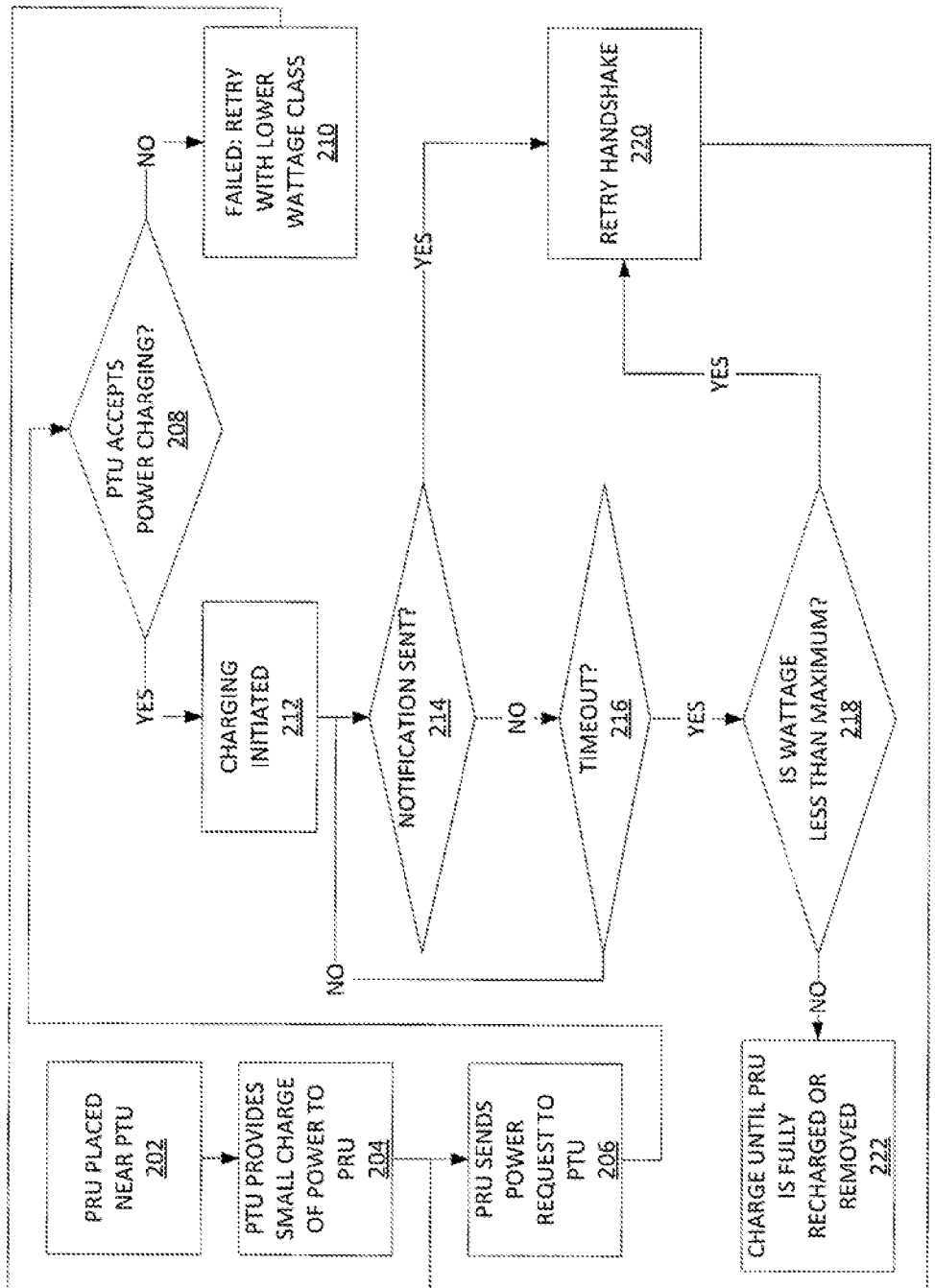
FIG. 2 is a flowchart of an example method for sub-optimal wireless charging.

FIG. 2 illustrates an example flowchart of a method 200 for sub-optimal wireless charging. The method 200 may be performed by the PRU 102 and PTU 104 of the system 100. At block 202 the method 200 begins and a PRU is placed near a PTU. For example, the PRU may be placed on top of the PTU.

At block 204, the PTU provides a small charge of power to the PRU. The small charge of power to the PRU may be used to initiate the handshake between the PRU and PTU for wireless charging and exchange information. For example, the PRU may send the PTU a unique identifier and a priority level of the PRU over a wireless communication.

At block 206, the PRU sends a power request or a wireless charging request to the PTU. The wireless charging request may include a first class type. The first class type may be the class type associated with the PRU for a full power recharging. For example, the PRU may be a class 1 device that requires 25 W of power for full power recharging.

At block 208, the PTU determines whether the wireless charging request should be accepted. For example, the PTU determines how much power is available and how much power is being requested based on the class type identified in the wireless charging request. If there is a mismatch, the wireless charging request is not accepted and the method 200 proceeds to block 210.

At block 210, a notification may be sent from the PTU to the PRU indicating that the wireless charging request failed. The PRU may then send another wireless charging request at a lower class type associated with less power. The method 200 may return to block 206. The blocks 206, 208 and 210 may be repeated iteratively with a lower class type with each subsequent re-sending of the wireless charging request from the PRU to the PTU until the wireless charging request is accepted at block 208.

For example, the amount of power available at the PTU may be 15 W. The first wireless charging request may include a class type 1 for 25 W, which is denied. The blocks 206 and 208 may be repeated with a second wireless charging request that may include a class type 2 for 20 W, which is denied. The blocks 206 and 208 may be repeated again with a third wireless charging request that may include a class type 3 for 15 W, which is accepted.

Referring back to block 208, if the PTU accepts the wireless charging request, the method 200 may proceed to block 212. At the block 212, wireless charging is initiated between the PRU and PTU at the accepted power level.

At block 214, the method 200 determines if a notification is sent from the PTU to the PRU. As described above, the notification may be sent from the PTU to the PRU that more power is available based on a priority level of the PRUs on the PTU, a recharging threshold level or a combination of both. The notification may include an exact amount of power that is available so that the PRU may intelligently select the class type to include in the wireless charging request. Alternatively, the notification may simply indicate that more power is available and the wireless charging request may be iteratively repeated until the proper class type is included in the wireless charging request that matches the amount of power available at the PTU.

If a notification is sent at block 214, the method 200 may proceed to block 220. At block 220, the PRU may retry the handshake procedure described above and re-send another wireless charging request at block 206. If a notification is not sent at block 214, the method 200 may proceed to block 216.

At block 216, the method 200 determines if a timeout has been reached. For example, a predefined period of time (e.g., 60 seconds, 10 minutes, 1 hour, and the like) may be used by the PRU to countdown periodically to re-send the wireless charging request. In one example, the predefined period of time may be a function of an estimated total time to fully charge the battery of the PRU and dynamically change as the estimated total time decreases. For example, if the PRU accepted a much lower power for recharging and the estimated time to fully charge is 6 hours, the PRU may set the predefined period of time to 60 seconds. At a later time, the PRU may have re-sent the wireless charging request and accepted a higher amount of power for recharging and the new estimated time to fully charge may be reduced to 2 hours. As a result, the PRU may change the predefined period of time to 10 minutes. In other words, the lower the amount of power and the longer the estimated recharging time, the more frequently the PRU may attempt to re-send the wireless charging request to obtain more power for recharging from the PTU.

If the timeout has not been reached, the method 200 may return to block 214 and cycle between block 214 and block 216 until a notification is sent or a timeout has been reached. If the timeout has been reached, the method 200 may proceed to block 218.

At block 218, the method 200 determines whether the wattage of power is less than the maximum. In other words, at block 218 the method 200 determines if the PRU is receiving the full amount of power associated with the class type of the PRU. If the PRU is receiving the full amount of power, the answer to block 218 is no and the method 200 proceeds to block 222. At block 222, the PRU is wireless recharged at full power until the battery of the PRU is fully recharged or the PRU is removed from the PTU.

If the answer to block 218 is yes, the method 200 may proceed to block 220. At block 220 the PRU may retry the handshake procedure described above and re-send the wireless charging request at block 206.

Figure 3:
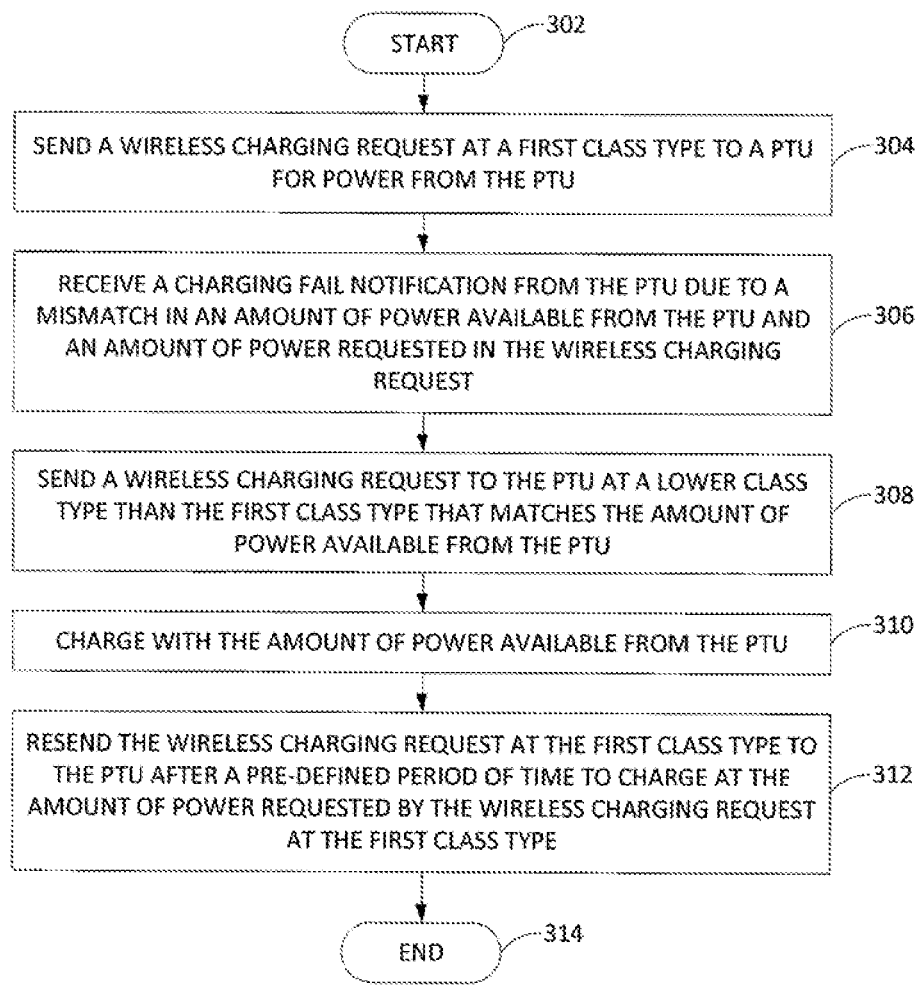
FIG. 3 is a flowchart of an example method for sub-optimal wireless charging from a perspective of a power receiving unit.
Figure 5:
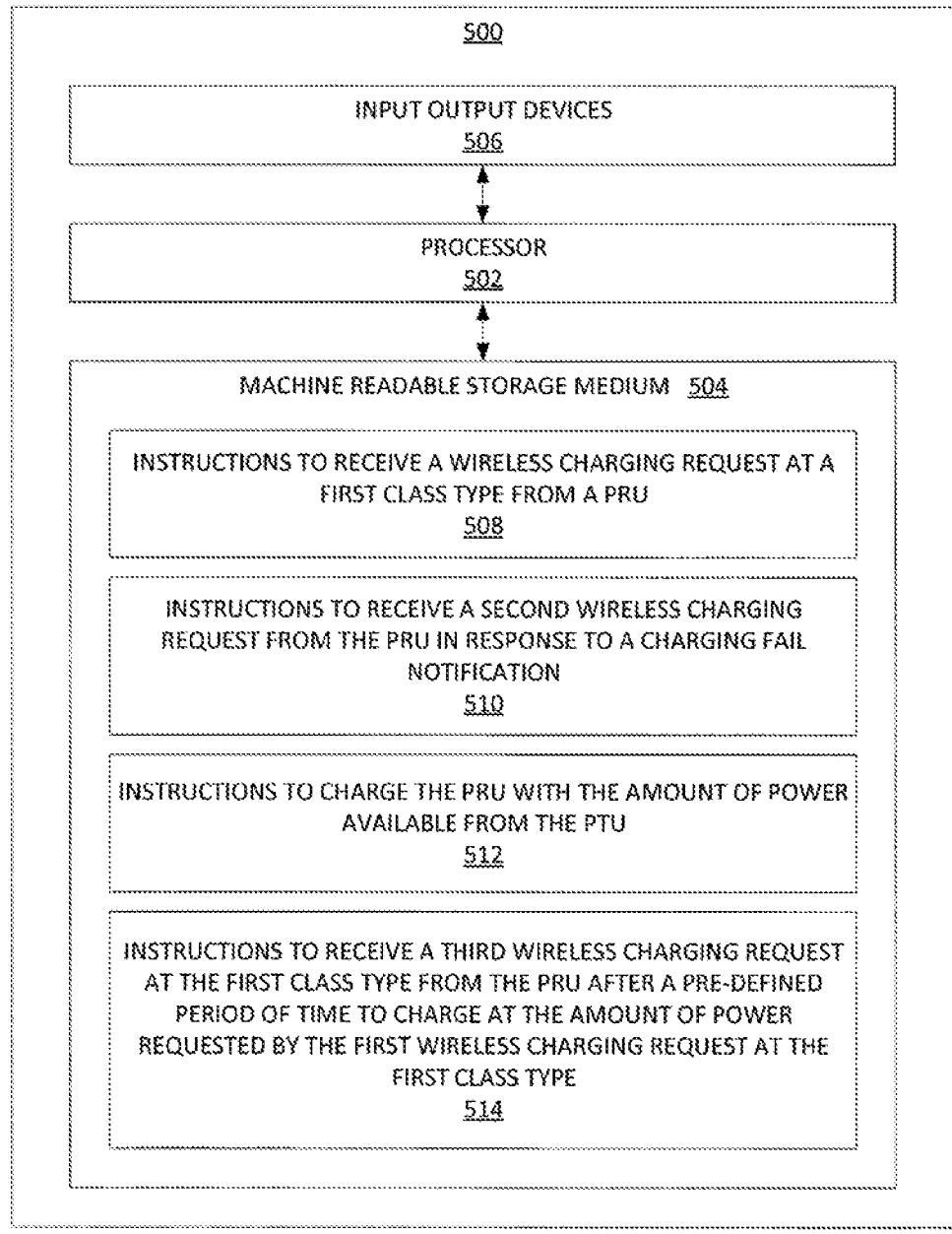
FIG. 5 is a high-level block diagram of an example computer suitable for use in performing the functions described herein.

FIG. 3 illustrates an example flowchart of a method 300 for sub-optimal wireless charging. In one example, the method 300 may be performed by the PRU 102, 130 or 140, a processor 106 of the PRU 102, or a computer as illustrated in FIG. 5 and discussed below.

At block 302 the method 300 begins. At block 304, a processor sends a wireless charging request at a first class type to a PTU for power from the PTU. The first class type may be the class type of the PRU such that the PRU may be recharged at full power.

At block 306, the processor receives a charging fail notification from the PTU due to a mismatch in an amount of power available from the PTU and an amount of power requested in the wireless charging request. For example, the PRU may be a class 2 device that requires 20 W of power for full power recharging. However, the PTU may have 10 W of power available. As a result, the first wireless charging request may fail and the notification from the PTU may be received by the PRU.

At block 308, the processor sends a wireless charging request to the PTU at a lower class type than the first class type that matches the amount of power available from the PTU. In one example, this may be an iterative process. For example, the PRU may send a second wireless charging request as a class 3 device that requires 15 W of power. However, the second wireless charging request may also fail. The PRU may then send a third wireless charging request as a class 4 device that requires 10 W of power. The third charging request may include a lower class type that requires an amount of power that matches the amount of power available at the PTU.

At block 310, the processor charges with the amount of power available from the PTU. Using the above example, the PRU may initially charge at a lower power as a class 4 device.

At block 312, the processor re-sends the wireless charging request at the first class type to the PTU after a pre-defined period of time to charge at the amount of power requested by the wireless charging request at the first class type. In other words, the PRU may periodically re-send the wireless charging request to re-initiate the wireless charging at the full amount of power required by the PRU. Using the above example, the PRU may periodically re-send the wireless charging request that includes the class type 2 for the full 20 W of power for recharging. The blocks 304, 308, 310 and 312 may be repeated by the PRU periodically until the full amount of power is received or the PRU is fully recharged.

In one example, the processor may re-send the wireless charging request before the pre-defined period of time if a notification is received from the PTU that more power is available based on a priority level, a recharging threshold being reached by other PRUs on the PTU or a combination of both the priority level and the recharging threshold being reached. The method 300 ends at block 314.

Figure 4:
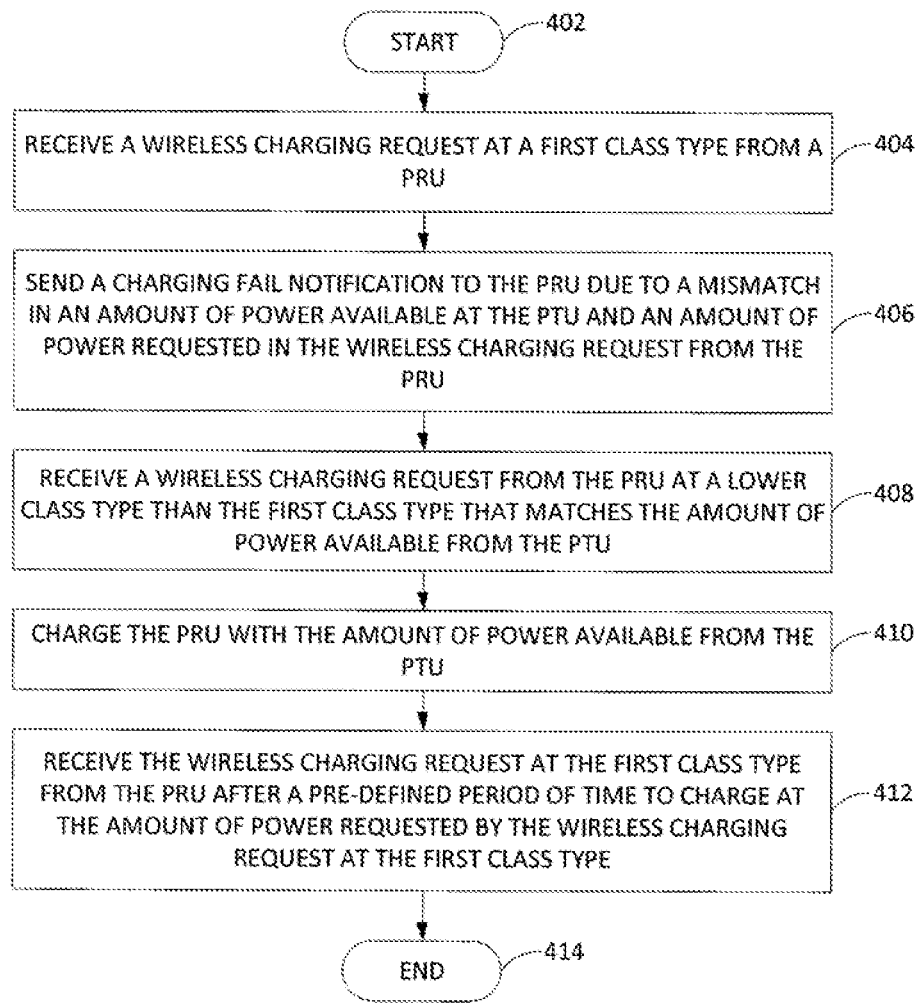
FIG. 4 is a flowchart of an example method for sub-optimal wireless charging from a perspective of a power transmitting unit.

FIG. 4 illustrates an example flowchart of a method 400 for sub-optimal wireless charging. In one example, the method 400 may be performed by the PTU 104, a processor 116 of the PTU 104, or a computer as illustrated in FIG. 5 and discussed below.

At block 402 the method 400 begins. At block 404, a processor receives a wireless charging request at a first class type from a PRU. The first class type may be the class type of the PRU such that the PRU may be recharged at full power.

At block 406, the processor sends a charging fail notification to the PRU due to a mismatch in an amount of power available at the PTU and an amount of power requested in the wireless charging request from the PRU. For example, the PRU may be a class 1 device that requires 25 W of power for full power recharging. However, the PTU may have 5 W of power available. As a result, the first wireless charging request may fail and PTU may send the notification to the PRU.

At block 408, the processor receives a wireless charging request from the PRU at a lower class type than the first class type that matches the amount of power available from the PTU. In one example, this may be an iterative process. For example, the PTU may receive a second wireless charging request as a class 2 device that requires 20 W of power. However, the second wireless charging request may also fail. The PTU may then receive a third wireless charging request as a class 3 device that requires 15 W of power. The third charging request may also fail. The PTU may continue to iteratively receive additional wireless charging requests until a wireless charging request as a class 5 device that requires 5 W of power is received that matches the amount of power available at the PTU.

At block 410, the processor charges the PRU with the amount of power available from the PTU. Using the above example, the PRU may initially charge at a lower power as a class 5 device.

At block 412, the processor receives the wireless charging request at the first class type from the PRU after a pre-defined period of time to charge at the amount of power requested by the wireless charging request at the first class type. In other words, the PTU may periodically receive the wireless charging request that is re-sent by the PRU to re-initiate the wireless charging at the full amount of power required by the PRU. Using the above example, the PRU may periodically re-send the wireless charging request that includes the class type 1 for the full 25 W of power for recharging. The blocks 404, 408, 410 and 412 may be repeated by the PTU periodically until the full amount of power can be sent to the PRU or the PRU is fully recharged.

In one example, the processor may receive the wireless charging request before the pre-defined period of time if the PTU sends a notification to the PRU that more power is available based on a priority level, a recharging threshold being reached by other PRUs on the PTU or a combination of both the priority level and the recharging threshold being reached. The method 400 ends at block 414.

It should be noted that although not explicitly specified, any of the blocks, functions, or operations of the example methods 200, 300 and 400 described above may include a storing, displaying and/or outputting block as required for a particular application. In other words, any data, records, fields, and/or intermediate results discussed in the methods can be stored, displayed, and/or outputted to another device as required for a particular application. Furthermore, blocks, functions, or operations in FIGS. 2-4 that recite a determining operation, or involve a decision, do not necessarily require that both branches of the determining operation be practiced.

FIG. 5 depicts an example high-level block diagram of a computer that can be transformed to into a machine that is dedicated to perform the functions described herein. As depicted in FIG. 5, the computer 500 comprises a hardware processor element 502, e.g., a central processing unit (CPU), a microprocessor, or a multi-core processor; a non-transitory computer readable medium, machine readable memory or storage 504, e.g., a random access memory (RAM); and various input/output user interface devices 506 to receive input from a user and present information to the user in human perceptible form, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like.

In one example, the non-transitory computer readable medium 504 may include a plurality of instructions 508, 510, 512 and 514. In one example, the instructions 508 may be instructions to receive a wireless charging request at a first class type from a PRU. In one example, the instructions 510 may be instructions to receive a second wireless charging request from the PRU in response to a charging fail notification. In one example, the instructions 512 may be instructions to charge the PRU with the amount of power available from the PTU. In one example, the instructions 514 may be instructions to receive the wireless charging request at the first class type from the PRU after a pre-defined period of time to charge at the amount of power requested by the wireless charging request at the first class type.

Although one processor element is shown, it should be noted that the computer may employ a plurality of processor elements. Furthermore, although one computer is shown in the figure, if the method(s) as discussed above is implemented in a distributed or parallel manner for a particular illustrative example, i.e., the blocks of the above method(s) or the entire method(s) are implemented across multiple or parallel computers, then the computer of this figure is intended to represent each of those multiple computers. Furthermore, hardware processors can be utilized in supporting a virtualized or shared computing environment. The virtualized computing environment may support virtual machines representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the blocks, functions and/or operations of the above disclosed methods. In one example, instructions 508, 510, 512 and 514 can be loaded into memory 504 and executed by hardware processor element 502 to implement the blocks, functions or operations as discussed above in connection with the example method 400. Furthermore, the instructions 508, 510, 512 and 514 may be modified to implement the blocks, functions or operations as discussed above in connection with the example methods 200 and 300. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the instructions 508, 510, 512, and 514, including associated data structures, of the present disclosure can be stored on a tangible or physical (e.g., non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations, therein may be subsequently made which are also intended to be encompassed by the following claims.

The invention claimed is:

1. A method, comprising:

sending, by a processor of a power receiving unit (PRU), a wireless charging request at a first class type to a power transmitting unit (PTU) for an amount of power from the PTU;

receiving, by the processor, a charging fail notification from the PTU due to a mismatch in an amount of power available from the PTU and the amount of power requested in the wireless charging request;

sending, by the processor, a wireless charging request to the PTU at a lower class type than the first class type that matches the amount of power available from the PTU, wherein the first class type is to define a first amount of power to be received and the lower class type is to define a second amount of power to be received;

charging, by the processor, at the second amount of power to be received based on the lower class type with the amount of power available from the PTU; and re-sending, by the processor, the wireless charging request at the first class type to the PTU after a pre-defined period of time to charge at the first amount of power to be received based on the first class type requested by the wireless charging request.

2. The method of claim 1, further comprising:

receiving, by the processor, a notification from the PTU that more power is available before the pre-defined period of time has expired; and re-sending, by the processor, the wireless charging request at the first class type to the PTU after the notification is received.

3. The method of claim 2, wherein the notification is based on a priority of each one of a plurality of devices being recharged by the PTU.

4. The method of claim 3, wherein the priority of the each one of the plurality of devices is user defined.

5. The method of claim 2, wherein the notification is based on a recharging threshold being reached for one of a plurality of devices being recharged by the PTU.

6. The method of claim 1, wherein the sending the wireless charging request to the PTU at the lower class type further comprises:

repeating, by the processor, the sending the wireless charging request to the PTU at different lower class types until an amount of power required by one of the different lower class types matches the amount of power available from the PTU.

* * * * *